No. 721,735. PATENTED MAR. 3, 1903.
G. B. ORTON.
RAILWAY VEHICLE COUPLING APPARATUS.
APPLICATION FILED JUNE 23, 1902.
NO MODEL.
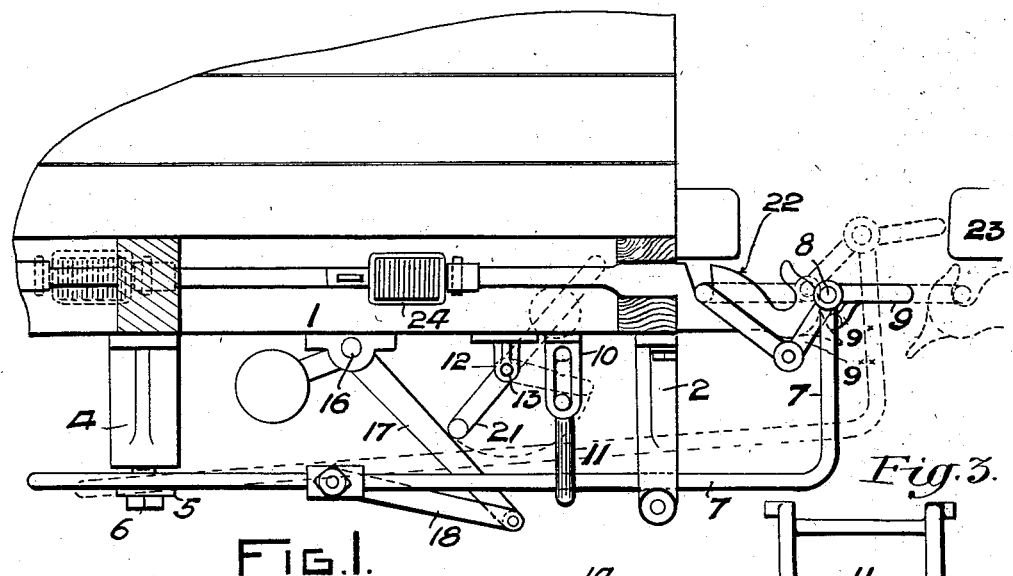
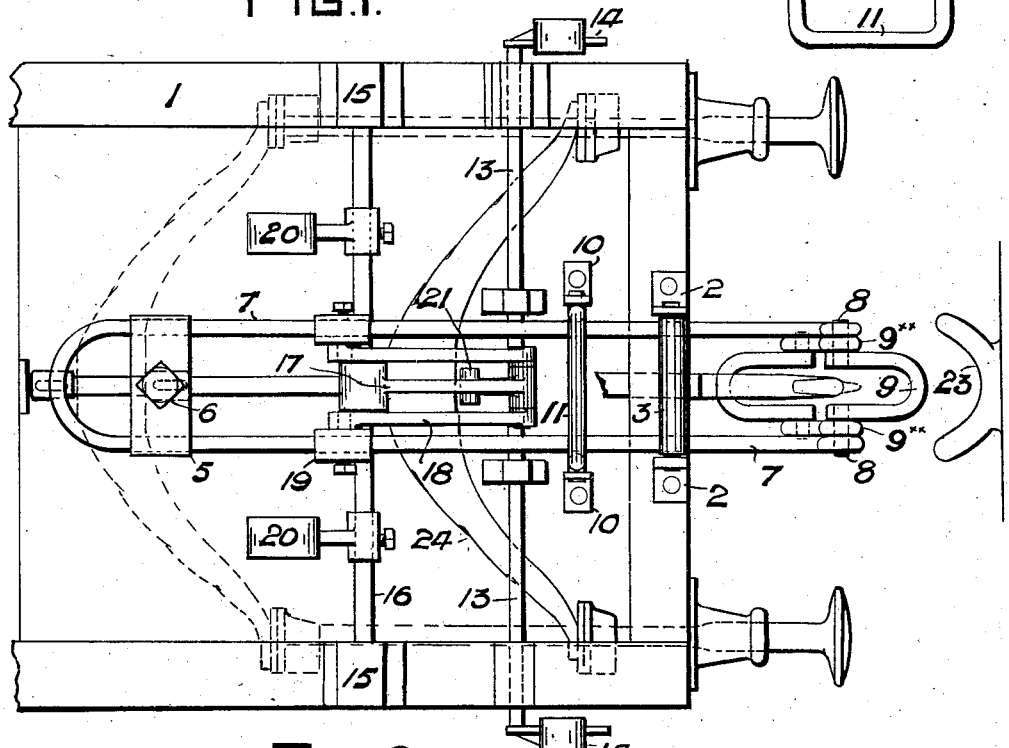
Witnesses:
John Camp.
William Eastwood.
Inventor:
Guy Bryan Orton
Walter Gunn.
By his Attorney:

UNITED STATES PATENT OFFICE.

GUY BRYAN ORTON, OF PATRICROFT, NEAR MANCHESTER, ENGLAND.

RAILWAY-VEHICLE COUPLING APPARATUS.

SPECIFICATION forming part of Letters Patent No. 721,735, dated March 3, 1903.

Application filed June 23, 1902. Serial No. 112,849. (No model.)

*To all whom it may concern:*

Be it known that I, GUY BRYAN ORTON, a subject of the King of Great Britain and Ireland, and a resident of Patricroft, near Manchester, England, have invented new and useful Improvements in Railway-Vehicle Coupling Apparatus, of which the following is a specification.

This invention has for its object to enable railway and like vehicles, and especially wagons, to be coupled and uncoupled without the necessity for any one to go between the vehicles; and a further object is to permit of a railway-vehicle fitted with my invention being coupled to a vehicle not fitted with my invention, and thus allow of its gradual introduction to the various railway systems, and to permit of my invention being clearly understood I have hereunto appended a sheet of drawings, in which—

Figure 1 illustrates a side elevation in part, and Fig. 2 an inverted plan, of a railway-wagon fitted with my invention. Fig. 3 is a front view of an important detail.

To the underframe 1 of the wagon I apply brackets 2, and between such brackets I support a roller 3; also, to the underframe I apply a further bracket 4, having a plate 5, held adjustably thereto by a bolt 6. Upon the plate 5 and roller 3 I support a U-shaped rod 7, the ends of which turn up and engage trunnions or studs 8 on the coupling-link 9, and thereby sustain the link in a position suitable for coupling to an adjoining wagon. In further and slotted brackets or bearings 10 I mount a further U-shaped rod or lifter 11, and the bridge of such lifter lies immediately below the two arms of the rod 7.

In bearings 12 I put a cross-shaft 13, extending outside the wagon and at each end fitted with a weighted operating lever-handle 14. In further bearings 15 I mount a further cross-shaft 16, and on such shaft is a lever 17, coupled by links 18 and adjustable collars 19, carrying studs, to the rod 7. Under the influence of weights 20 the lever and links hold the rod 7 and coupling-link 9 in the position shown by full lines in Fig. 1.

Upon the shaft 13 I mount a lever-arm 21, with T-shaped extremity, and the length of such arm is such that its extremity is capable of coming against the lever 17, and thereby holding the rod 7 and link 9 in the position shown by full lines in Fig. 1, or of coming below and raising the yoke 11, and therefore of raising the rod 7 and link 9 to the position shown by dotted lines in Fig. 1 ready for coupling.

With the hook of the adjoining wagon below the link when so raised it is then lowered and the coupling thus effected without the need of going between the wagons. To uncouple the wagons, the coupler-rod 7 (and consequently the link 9) is raised and allowed to retire under the influence of the weights 20.

To permit of the wagons coupling automatically, the nose of the draw-hook 22 may be of the form shown by dotted lines, and to insure the link 9 coming over the hook each wagon may have a curved (focus) plate 23, against which the link strikes, this arrangement being specially useful when coupling the wagons on a curve.

The usual draw-spring 24 may be arranged as shown by full lines or dotted lines, and the link 9 is sustained horizontally by small snugs $9^\times$, lying against link $9^{\times\times}$.

What I claim is—

In coupling apparatus for railway-wagons and the like, a coupling-link with lateral studs, a coupler-rod of U shape, and having upturned ends engaging the said studs, means for sustaining the said coupler-rod below the wagon, a cross-shaft having a lever-arm, and links for coupling such arm to the said coupler-rod, a weighted arm also on the said shaft, a rod or yoke of U formation, slotted brackets in which such yoke is mounted, a further cross-shaft with weighted lever-handles and a further arm with T-shaped extremity, capable of pressing against the lever connected with a rod, or of lifting the said yoke and coupler-rod, substantially as and for the purposes herein set forth.

In witness whereof I have hereunto set my hand in the presence of two witnesses.

GUY BRYAN ORTON.

Witnesses:
JOHN CAMP,
WILLIAM EASTWOOD.